United States Patent [19]

Tomotaki

[11] Patent Number: 5,586,468
[45] Date of Patent: Dec. 24, 1996

[54] TABLE DRIVING DEVICE

[75] Inventor: Katsura Tomotaki, Narashino, Japan

[73] Assignee: Seiko Seiki Kabushiki Kaisha, Japan

[21] Appl. No.: 282,077

[22] Filed: Jul. 28, 1994

[30] Foreign Application Priority Data

Jul. 30, 1993 [JP] Japan .................................. 5-190576

[51] Int. Cl.⁶ .................................................. F16H 25/24
[52] U.S. Cl. .................... 74/89.15; 74/424.8 R;
108/143; 248/657
[58] Field of Search ................... 74/89.15, 424.8 R;
108/143; 248/657

[56]  References Cited

U.S. PATENT DOCUMENTS

| | | | |
|---|---|---|---|
| 3,665,782 | 5/1972 | Loftus | 74/424.8 R |
| 4,372,223 | 2/1983 | Iwatani | 74/89.15 |
| 4,597,303 | 7/1986 | Nakaya | 74/89.15 |

*Primary Examiner*—Allan D. Herrmann
*Attorney, Agent, or Firm*—Adams & Wilks

[57]  ABSTRACT

It is intended to provide a table driving device which does not make a machine unduly large, and moves a table with high accuracy without being affected by deflection components of a nut as caused by rotation of a feed screw. The table driving device includes a guide portion with which a part of a table is movably engaged, a driving motor for rotating a feed screw, a nut threadedly engaged with the feed screw that is disposed in parallel with a moving direction of the table, a nut holder having a nut connecting portion connected to the nut and an engaging portion movably engaged with the guide portion, and moving along the feed screw and the guide portion together with the nut in accordance with the rotation of the feed screw, and a coupling mechanism for coupling the engaging portion of the nut holder to the part of the table that is engaged with the guide portion through balls that can roll in planes perpendicular to the moving direction of the table.

2 Claims, 4 Drawing Sheets

TABLE DRIVING DEVICE

BACKGROUND OF THE INVENTION

1. Field of the Invention

The present invention relates to a table driving device for driving a movable table used in machine tools such as a grinding machine.

2. Description of the Prior Art

Conventionally, mechanisms using a feed screw such as a ball screw are widely employed to move a movable table of the above type. However, where a nut that is threadedly engaged with a feed screw is directly connected to a table, a deflection, torsional moment, vibration, etc. of a nut (hereinafter referred to as deflection components of a nut) associated with rotation of the feed screw are all transmitted to the table, to make it difficult to move the table with high accuracy.

To solve this problem, for example, Japanese Patent Application Unexamined Publication No.63-185550 discloses a movable table which is divided into a main table and a sub-table, and is equipped with a mechanism for coupling these two tables. This coupling mechanism includes a guide joint having a pair of guide surfaces facing each other back to back and perpendicular to the axial line of a feed screw, a presser joint having a pre-load applying means that includes a ball supporting surface opposed to one of the guide surfaces and a ball pressing surface opposed to the other guide surface, a pair of balls interposed between the ball supporting surface of the presser joint and the one guide surface of the guide joint and between the ball pressing surface and the other guide surface of the guide joint. According to this movable table, deflection components of a nut associated with rotation of the feed screw can be absorbed by rolling of the balls.

However, this movable table has a problem that a machine is inevitably made large because the table is divided into the two large parts. Further, since the guide surface for guiding the table and the coupling mechanism for force transmission from the sub-table to the main table are offset from each other, the main table particularly receives such a force as causes pitching (i.e., vibration about the axial line lateral to the table moving direction), so that the accuracy of the table movement is deteriorated.

Further, it is difficult to uniformly apply pre-loads over the entire ball rolling area. Still further, the above coupling mechanism cannot be applied to large-size tables because thrust is given through one point between the pair of balls.

SUMMARY OF THE INVENTION

It is an object of the present invention to provide a table driving device which does not make a machine unduly large, and can move a table with high accuracy without being affected by deflection components of a nut that are associated with rotation of a feed screw.

It is another object of the invention to provide a table driving device which, in addition to the above, can apply substantially uniform pre-loads to balls for absorbing deflection components of a nut that are associated with rotation of a feed screw, and can be used for large-size tables.

A table driving device according to the invention comprises a guide portion with which a part of a table is movably engaged, for guiding the table; a feed screw disposed in parallel with a moving direction of the table; driving means for rotating the feed screw; a nut threadedly engaged with the feed screw; a nut holder having a nut connecting portion connected to the nut and an engaging portion movably engaged with the guide portion, and moving along the feed screw and the guide portion together with the nut in accordance with the rotation of the feed screw; and a coupling portion for coupling the engaging portion of the nut holder to the part of the table that is engaged with the guide portion through a ball that can roll in a plane perpendicular to the moving direction of the table.

With the above constitution, the part of the table is engaged with the guide portion, which guides the table. When the feed screw is rotated by the driving means, the nut, which is threadedly engaged with the feed screw and prevented from rotating by the nut holder, is moved by the feed screw, and the nut holder connected to the nut is moved along the feed screw and the guide portion. With the movement of the nut holder, the table, which is coupled to the nut holder through the coupling portion, is moved along the guide portion. Since the coupling portion couples the engaging portion of the nut holder to the part of the table that is engaged with the guide portion through the ball that can roll in the plane perpendicular to the table moving direction, the rolling of the ball prevents deflection components of the nut as caused by the rotation of the feed screw from being transmitted to the table. Further, since the engaging portion of the nut holder and the part of the table that is engaged with the guide portion are coupled to each other through the coupling portion in the state that they are engaged with the guide portion, and the force transmission from the nut holder to the table is effected within the guide portion, the table does not receive such a force as causes pitching.

In the above constitution, the ball of the coupling portion may be a plurality of balls arranged on a circumference, and the coupling portion may comprise means for applying pre-loads to the plurality of balls. In this case, since the plurality of balls are arranged on the circumference, the pre-loads can be applied to the balls substantially uniformly. Further, since the force is transmitted through the plurality of balls, the table driving device can be applied to large-size tables.

DESCRIPTION OF THE PREFERRED EMBODIMENT

A table driving device according to an embodiment of the present invention will be hereinafter described in detail with reference to the accompanying drawings.

Figure 1:
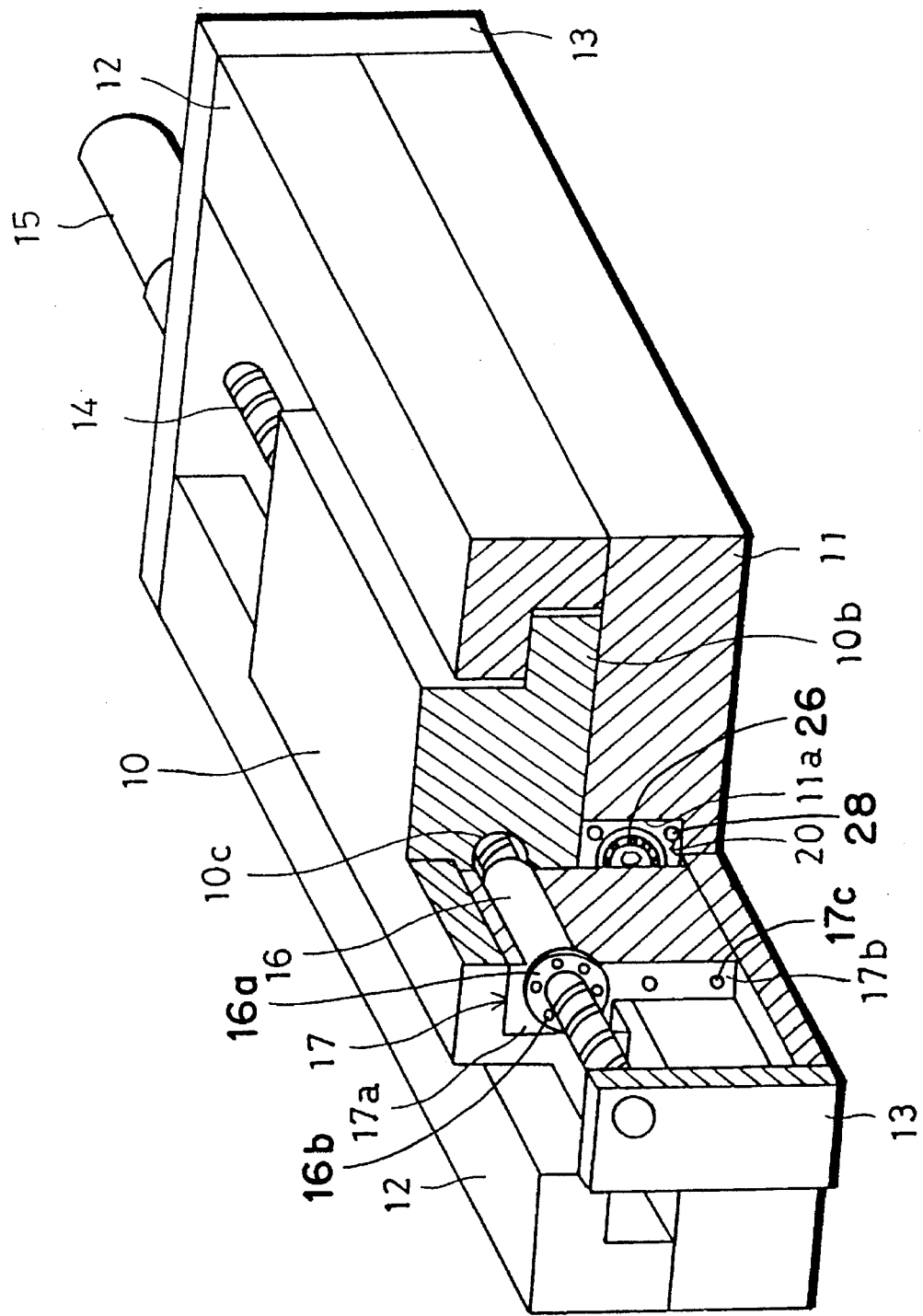
FIG. 1 is a partially cutaway perspective view of a table driving device according to an embodiment of the present invention.
Figure 2:
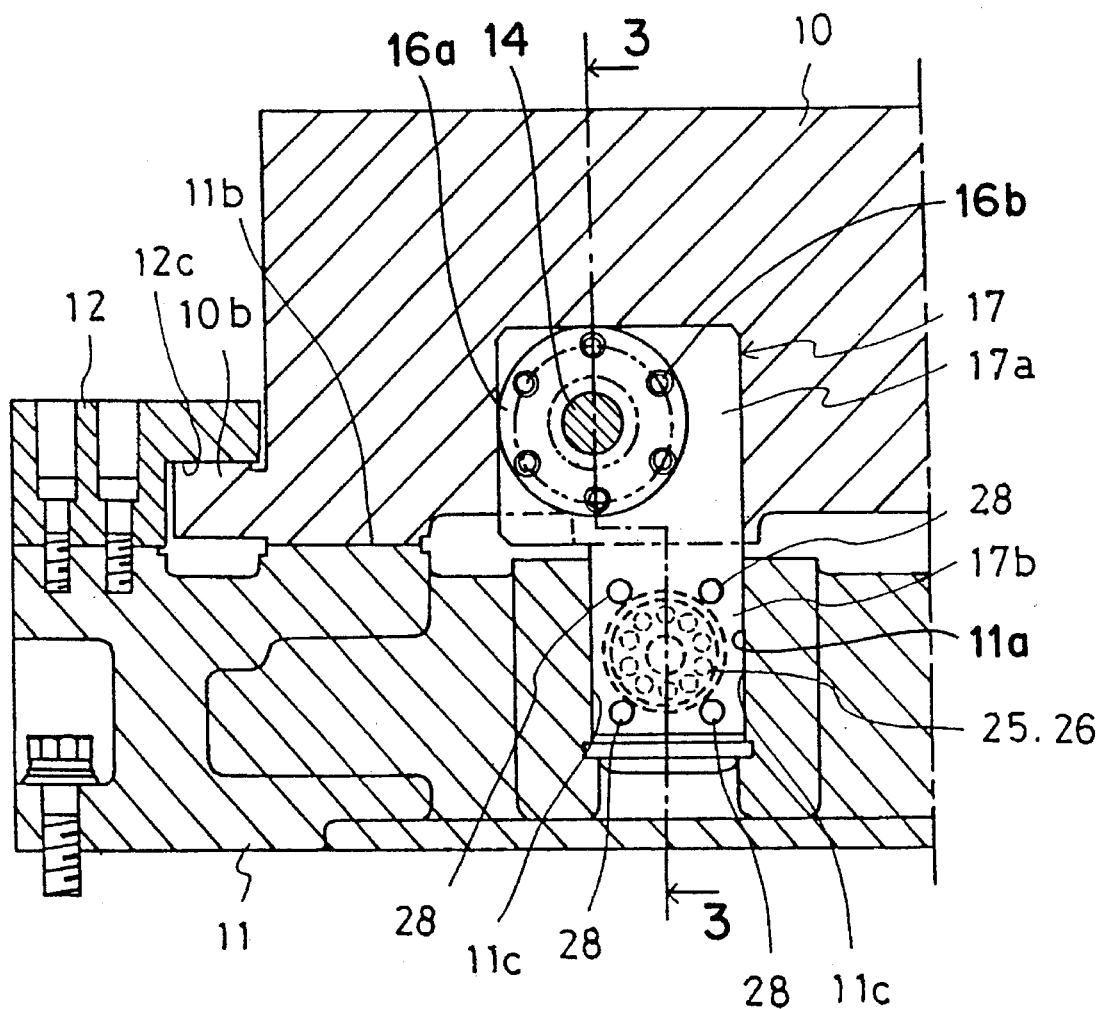
FIG. 2 is a sectional view of a coupling mechanism portion in FIG. 1 taken by a plane perpendicular to a table moving direction.
Figure 3:
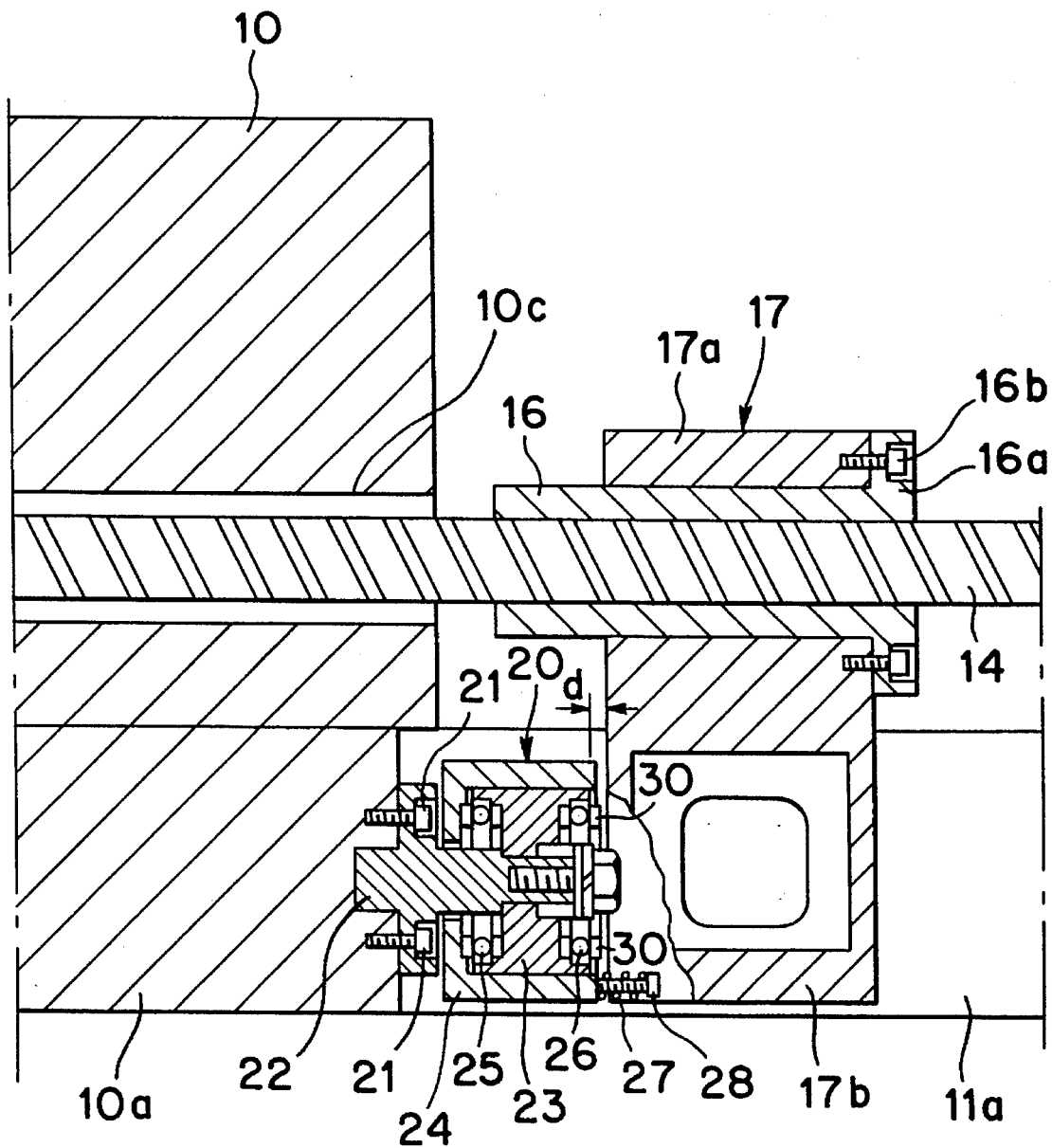
FIG. 3 is a sectional view taken along line 3—3 in FIG. 2.
Figure 4:
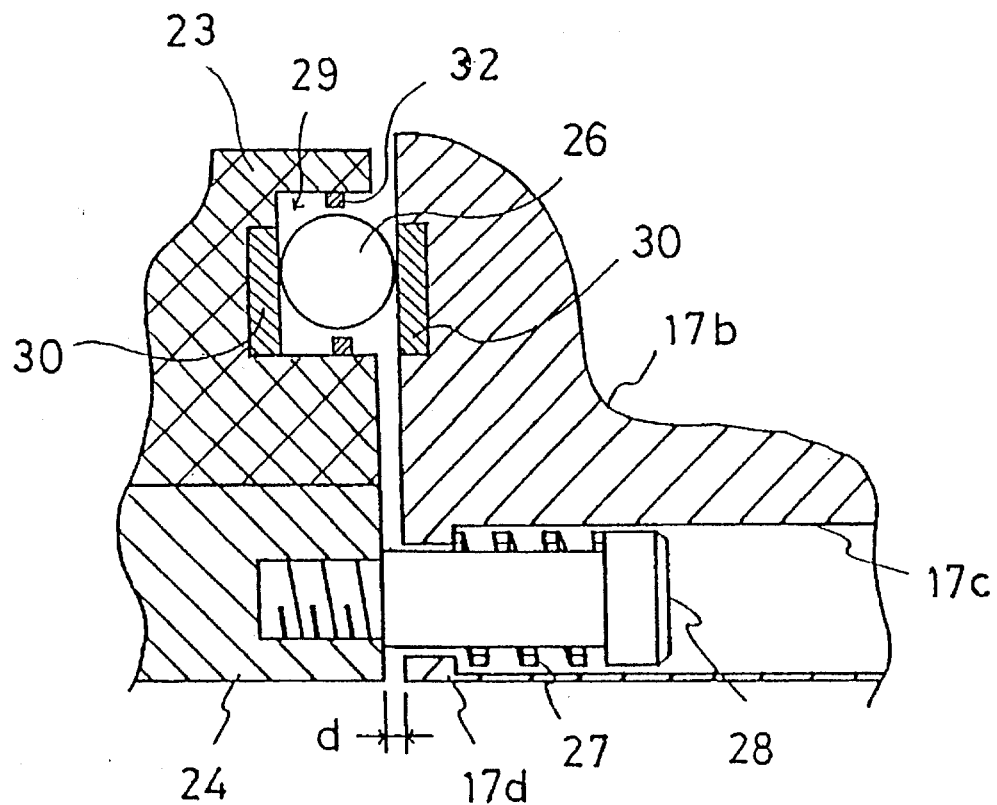
FIG. 4 is an enlarged sectional view of a shoulder bolt portion in FIG. 3.

FIG. 1 is a partially cutaway perspective view of a table driving device according to the embodiment, FIG. 2 is a sectional view of a coupling mechanism portion in FIG. 1 taken by a plane perpendicular to a table moving direction, FIG. 3 is a sectional view taken along line 3—3 in FIG. 2, and FIG. 4 is an enlarged sectional view including a shoulder bolt portion and a ball 26 supporting portion in FIG. 3.

As shown in FIG. 1, to rotatably support and guide a table 10, the table driving device has a base 11 and two guides 12 placed on the base 11.

As shown in FIG. 2, the base 11 has, in its top surface, a guide portion 11a that is a groove portion extending along the moving direction of the table 10 and having a rectangular cross-section. The table 10 is placed on the base 11 (see FIG. 1), and has an engaging portion 10a that is engaged with the guide portion 11a (see FIG. 3). Further, the table 10 has flange portions 10b on both sides of the portion placed on the base 11, and the guides 12 are so constructed as to press the flange portions 10b from above. As shown in FIG. 2, end faces 12c of the guides 12 that contact with top faces of the flange portions 10b of the table 10, top faces 11b of the base 11 that contact with bottom faces of the table 10, and both side faces 11c of the guide portion 11a are static pressure guide surfaces for guiding the table 10 through an oil film.

As shown in FIG. 1, the table driving device further has a ball screw 14 that is a feed screw rotatably supported by bearing brackets 13. The ball screw 14 penetrates the table 10 through a hole 10c in parallel with the movement direction of the table 10. A driving motor 15 is connected to the end portion of the ball screw 14 to rotate it. The ball screw 14 is threadedly engaged with a nut 16. The nut 16 is connected to a nut holder 17, which has a nut connecting portion 17a that is connected to the nut 16 and an engaging portion 17b that is movably engaged with the guide portion 11a of the base 11. The nut 16 is connected to the engaging portion 17b through a connecting plate 16a and bolts 16b. Therefore, the nut holder 17 serves to prevent rotation of the nut 16 because the engaging portion 17b is engaged with the guide portion 11a of the base 11, and is moved along the ball screw 14 and the guide portion 11a of the base 11 together with the nut 16 in accordance with the rotation of the ball screw 14.

The engaging portion 17b of the nut holder 17 and the engaging portion 10a of the table 10 are coupled to each other through a coupling mechanism (coupling portion) 20. The coupling mechanism 20 includes a shaft member 22 fixed to the end face of the engaging portion 10a of the table 10 on the nut holder 17 side with screws 21, a thick, disc-shaped spacer 23 fixed to the end face of the shaft member 22 on the nut holder 17 side, an intermediate member 24 having a cylindrical space for accommodating the spacer 23 and connected to the engaging portion 17b of the nut holder 17 with four shoulder bolts 28, a plurality of balls 25 provided between one end face of the spacer 23 and the inner end face of the intermediate member 24, and a plurality of balls 26 provided between the other end face of the spacer 23 and the end face of the engaging portion 17b of the nut holder 17.

To accommodate the balls 25 or 26, a ring-shaped groove 29 is formed in each end face of the spacer 23. As shown in FIG. 4, a hardened collar 30 is attached to the side face of the groove 29 which contacts with the balls 25 or 26. Similarly, a collar 30 is attached to each of the inner end face of the intermediate member 24 which contacts with the balls 25 and the end face of the engaging portion 17b of the nut holder 17 which contacts with the balls 26.

Figure 5:
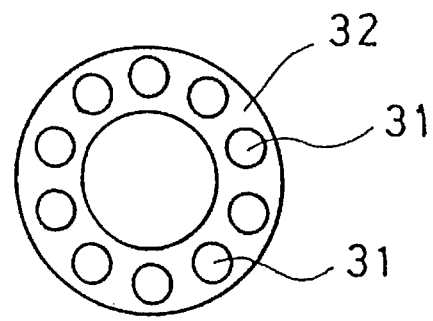
FIG. 5 is a front view showing an appearance of a retainer.

As shown in FIG. 5, a retainer (ball supporting member) 32 is disposed in the groove 29 of the spacer 23 to support the balls 25 or 26. The retainer 32 has a structure in which holes 31 that are slightly larger than the balls 25 and 26 are formed in a thin, ring-shaped plate by a number identical to the number of balls 25 or 26. As shown in FIG. 2, each of the two sets of balls 25 or 26 includes a plurality of, for instance, 10 balls that are arranged on a circumference at equal intervals.

A means for applying pre-loads to the two sets of balls 25 and 26 will be described below. As shown in FIG. 4, in a state that the spacer 23 and the balls 25 and 26 are accommodated in the intermediate member 24, a small gap d is formed between the intermediate member 24 and the engaging portion 17b of the nut holder 17. Further, holes 17c into which the shoulder bolts 28 are inserted are formed in the engaging portion 17b of the nut holder 17. The diameter of the hole 17c is made somewhat larger than the head diameter of the shoulder bolt 28 except for its end portion on the side of the intermediate member 24. The end portion of the hole 17c on the side of the intermediate member 24 has a diameter smaller than the head diameter and somewhat larger than the shaft diameter of the shoulder bolt 28, and serves as an engaging portion 17d with which a spring (described later) is engaged. The shoulder bolt 28 is inserted into the hole 17c with its thread portion engaged with the intermediate member 24.

A compression spring 27 that is a square spring is disposed between the head of the shoulder bolt 28 and the engaging portion 17d. The compression spring 27 urges the intermediate member 24 and the engaging portion 17b of the nut holder 17 against each other, i.e., generates a bias force acting to decrease the gap d, to thereby apply pre-loads to the balls 25 or 26 interposed in between.

The three objects of applying pre-loads in this embodiment are to increase the rigidity of the bearings including the balls 25 and 26, to suppress vibration and a backlash of the table 10 in the axial direction, and to keep the rolling bodies (balls) in place with respect to the track rings.

Since the ball supporting portions are larger than the balls 25 and 26, the balls 25 and 26 can roll in planes perpendicular to the moving direction of the table 10.

The operation of the embodiment will be hereinafter described.

When the ball screw 14 is rotated by the driving motor 15, the nut 16 is moved along the ball screw 14 and, as a result, the nut holder 17 is moved along the guide portion 11a of the base 11. With the movement of the nut holder 17, the table 10, which is coupled to the engaging portion 17b of the nut holder 17 through the coupling mechanism 20, is moved while being guided by the static pressure guide surfaces of the base 11 and the guides 12.

Although deflection components occur in the nut 16 and the nut holder 17 due to the rotation of the ball screw 14, the rolling of the balls 25 and 26 of the coupling mechanism 20 in the planes perpendicular to the table moving direction prevents those deflection components from being transmitted to the table 10.

When the nut holder 17 pushes the table 10, the pushing force of the nut holder 17 is transmitted to the table 10 through the balls 26, spacer 23 and shaft member 22. In this case, the balls 25 and 26 receive the force of the compression spring 27 plus the pushing force of the nut holder 17.

On the other hand, when the nut holder 17 pulls the table 10, the pulling force of the nut holder 17 is transmitted to the table 10 through the balls 25, spacer 23 and shaft member 22. In this case, the balls 25 and 26 receive the force of the compression spring 27 minus the pulling force of the nut holder 17.

In the embodiment, the engaging portion 17b of the nut holder 17 and the engaging portion 10a of the table 10 are coupled to each other through the coupling mechanism 20 in the state that they are engaged with the guide portion 11a, and the force transmission from the nut holder 17 to the table 10 is effected within the guide portion 11a. Therefore, the table 10 does not receive such a force as causes pitching.

In the embodiment, since pre-loads are applied to a plurality of balls 25 and 26 arranged on the circumferences by the intermediate member 24 in the coupling mechanism 20, they can be applied to the balls 25 and 26 substantially uniformly. Further, since the force is transmitted through a plurality of balls, the table driving device of the embodiment can be applied to large-size tables.

As described above, according to the invention, since the nut holder is provided that is engaged with the guide portion, and the engaging portion of the nut holder is coupled to the part of the table that is engaged with the guide portion through the coupling portion in the state that they are engaged with the guide portion, the table driving device does not make a machine unduly large and can move the table without being affected by deflection components of the nut as caused by the rotation of the feed screw. Further, since the force transmission from the nut holder to the table is effected within the guide portion, the table does not receive such a force as causes pitching.

The following advantages are obtained in addition to the above ones. Since a plurality of balls are arranged on the circumferences in the coupling portion and given pre-loads by the pre-load applying means, the pre-loads can be applied to the balls substantially uniformly. Further, since the force is transmitted through a plurality of balls, the table driving device can be applied to large-size tables.

What is claimed is:

1. A table driving device comprising:

a guide portion with which a part of a table is movably engaged for guiding the table;

a feed screw disposed in parallel with a moving direction of the table;

driving means for rotating the feed screw;

a nut threadedly engaged with the feed screw;

a nut holder having a nut connecting portion connected to the nut and an engaging portion movably engaged with the guide portion, and moving along the feed screw and the guide portion together with the nut in accordance with the rotation of the feed screw; and a coupling portion for coupling the engaging portion of the nut holder to the part of the table that is engaged with the guide portion through a ball that can roll in a plane perpendicular to the moving direction of the table.

2. The table driving device according to claim 1, wherein the ball of the coupling portion comprises a plurality of balls arranged on a circumference and wherein the coupling portion comprises means for applying pre-loads to the plurality of balls.

* * * * *